June 7, 1927. 1,631,447
H. ZUBROW ET AL
CUSHIONING UNIT FOR VEHICLE TIRES
Filed Jan. 14, 1926   2 Sheets-Sheet 1

Inventors
H. Zubrow.
E. Solomon.
By Lacy & Lacy, Attorneys

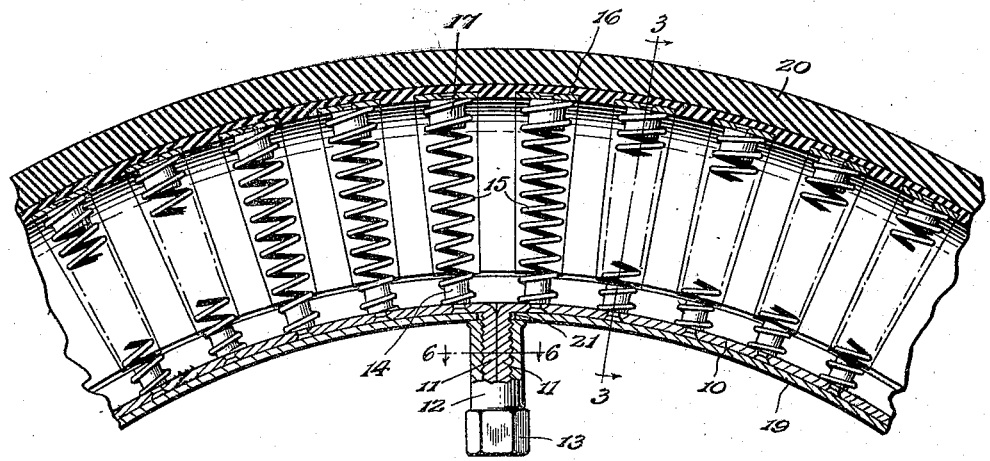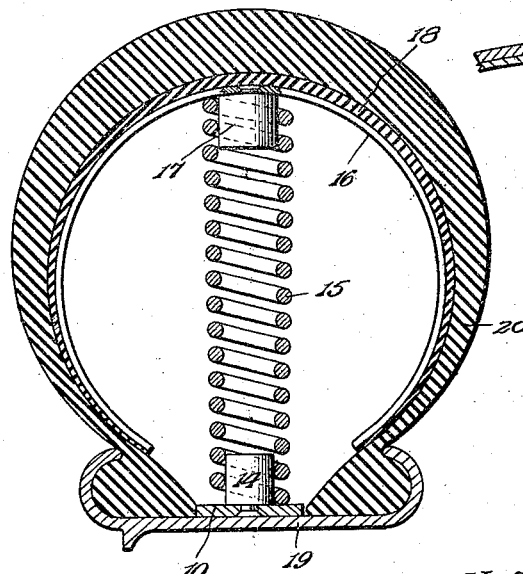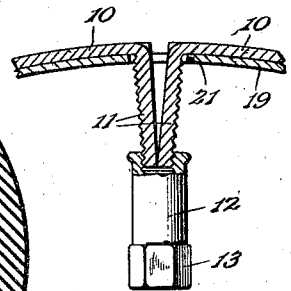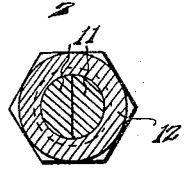

Patented June 7, 1927.

1,631,447

UNITED STATES PATENT OFFICE.

HEDWIG ZUBROW AND EMIL SOLOMON, OF PHILADELPHIA, PENNSYLVANIA.

CUSHIONING UNIT FOR VEHICLE TIRES.

Application filed January 14, 1926. Serial No. 81,286.

This invention relates to an improved cushioning unit for motor vehicle tires and seeks, among other objects, to provide a unit adapted to supplant the usual inner tube and which will eliminate the troubles of punctures and blow-outs while, at the same time, the unit will impart to the tire substantially the same cushioning qualities possessed by the ordinary pneumatic tire.

The invention seeks, as a further object, to provide a device which may be readily mounted upon conventional rims and which may be used in connection with conventional tire casings as commonly employed.

And the invention seeks, as a still further object, to provide a device which will be comparatively simple in its construction and wherein provision will be made for protecting the tire casing against injury by the device.

Other objects of the invention not specifically mentioned in the foregoing will appear during the course of the following description.

In the accompanying drawings:

Figure 2 is an enlarged fragmentary sectional view particularly showing the arrangement of the cushioning springs employed.

Figure 3 is a transverse sectional view on the line 3—3 of Figure 2, looking in the direction indicated by the arrows.

Figure 5 is a detail sectional view showing the normal position of the anchoring lugs at the ends of the inner clamping band of the unit.

Figure 6 is a transverse sectional view on the line 6—6 of Figure 2, looking in the direction indicated by the arrows.

Figure 1:
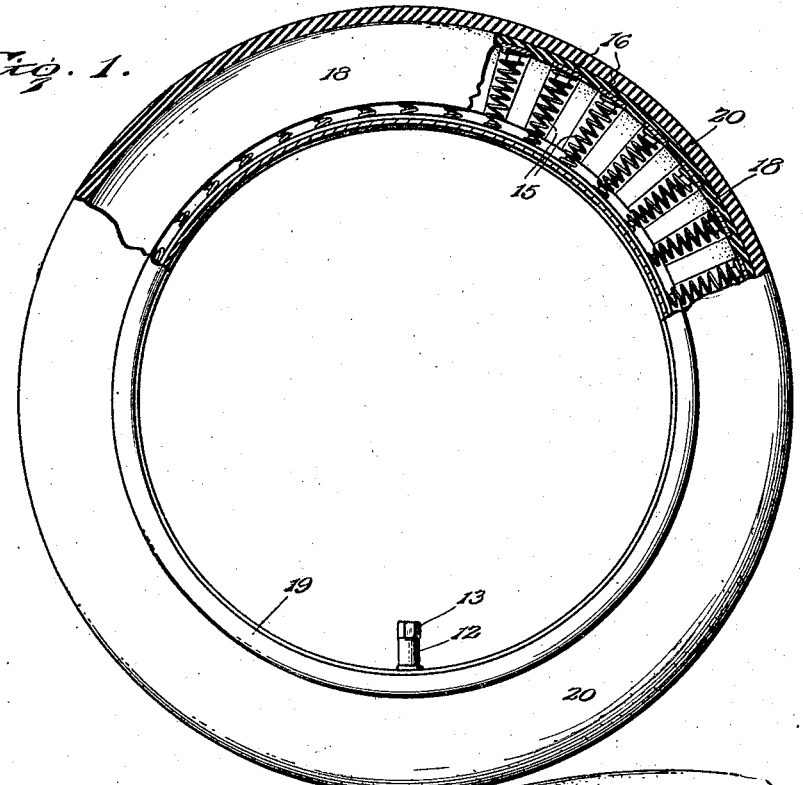
Figure 1 is a side elevation showing our improved cushioning unit in conjunction with a conventional rim and tire casing, parts being broken away and shown in section.
Figure 4:
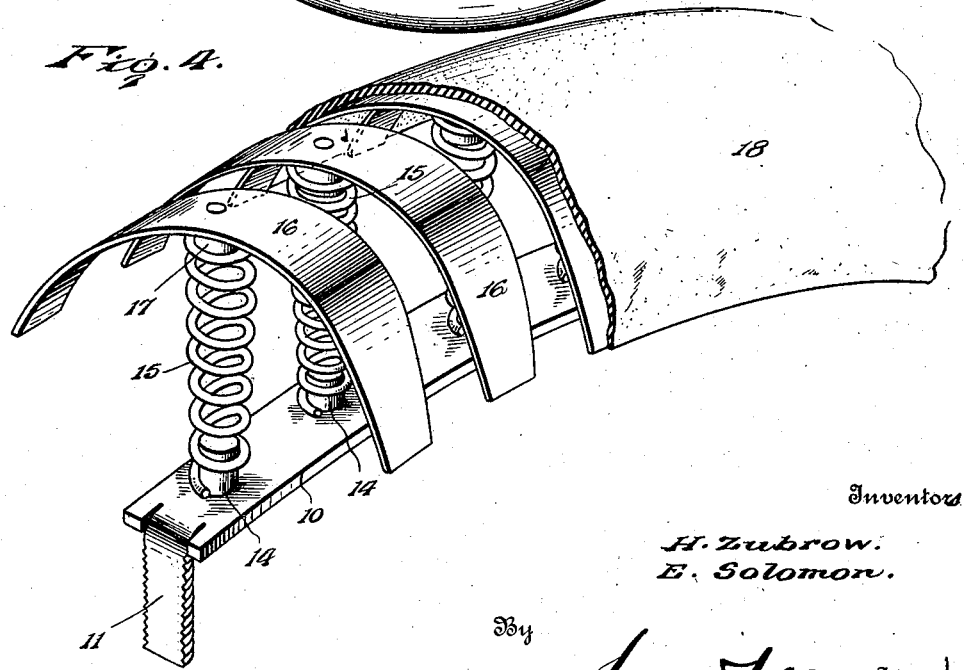
Figure 4 is a fragmentary perspective view looking at one end of the cushioning unit, the flexible retaining cover for the tread springs being broken away.

In carrying the invention into effect, we employ a split inner clamping band 10. This band is preferably formed of a resilient metal strap bent into shape so that, as will be seen, the band produced is split at one point only. Formed on the ends of the band is a pair of inwardly directed radial lugs 11 having flat inner faces lying flush with the end edges of the band while the outer faces of the lugs are rounded and screw threaded. The lugs are thus adapted to mate to form a cylindrical stem, and engageable over said stem is a cap 12 internally threaded to engage the threads of the stem, the cap being provided at its outer end with a wrench receiving head 13.

Riveted or otherwise fixed to the band 10, at suitably spaced points, are radially projecting studs 14, and tightly engaged at their smaller ends over said studs are tapered load sustaining springs 15. The springs 15 carry a plurality of transversely arranged substantially semi-circular tread springs 16, these tread springs preferably flat transversely and being tapered at their end portions. Riveted or otherwise fixed to the tread springs at points midway between the ends thereof are studs 17 and, as will be observed, the outer ends of the load springs 15 are tightly engaged about said studs for connecting the tread springs with the load springs. Overlying the tread springs 16 is a split annular retaining cover 18. This retaining cover is shaped transversely to conform to the shape of the springs 16 and is preferably of rubber, the cover possessing sufficient elasticity to freely flex and stretch with the movement of the springs 16. Preferably, these springs are embedded in the cover at its inner side so that the cover is thus securely connected to said springs.

In Figures 1, 2 and 3 of the drawings, we have shown our improved cushioning unit in connection with a conventional wheel rim 19 and tire casing 20, the rim being provided with the usual valve receiving opening 21. Initially, the clamping band 10 is positioned about the rim medially thereof, when the lugs 11 are, as shown in Figure 5, inserted through the opening 21 of the rim. These lugs are normally tilted with respect to the ends of the band so that, when the band is thus initially applied about the rim, the lugs will, as brought out in Figure 5, converge toward their free ends into abutting relation. The cap 12 is then engaged over the free ends of said lugs and screwed thereon for shifting the lugs into abutting relation throughout their length, as shown in Figure 2, and contracting the band 10 tightly about the rim. The clamping band will thus be rigidly secured upon the rim while the lugs 11 will coact with the wall of the opening 21 of the rim for limiting the band against creeping. The casing 20 is then applied about the rim over the cushioning means and engaged with the rim in the usual manner. As will be observed upon reference to Figure 3, the clamping band 10 is of a width to be snugly received between the beads of the tire casing and while, in the present instance, we have shown our improved unit in connection with a rim of the clincher type still, it is to be understood that the unit may also be employed with equal facility in connection with rims of other types.

It is now to be observed that the cushioning unit will normally hold the tire casing 20 distended so that externally the tire will have the normal appearance of an ordinary pneumatic tire. In other words, when the tire casing is applied, the load springs 15 are normally compressed somewhat by the casing while the tread springs are also contracted. Both sets of springs are thus held under compression by the tire casing for not only maintaining the casing distended but also maintaining the casing in firm engagement with the rim. Accordingly, as the tire revolves, the springs 15 will flex for yieldably supporting and cushioning the load while, likewise, the tread springs 16 will also flex for yieldably supporting and cushioning the load auxiliary to the springs 15, and since the retaining cover 18 lies between the tread springs and the tire casing, abrasion or injury to the casing will be effectually prevented.

Having thus described the invention, what we claim is:

1. The combination with a rim provided with an opening, of a split clamping band encircling the rim and provided at its ends with mating lugs extending through said opening, means engaging said lugs and adjustable thereon for contracting the band tightly about the rim, radial load carrying springs carried by the band, transversely disposed tread springs carried by said load springs, and a casing engaged with the rim to enclose said springs and normally held distended thereby.

2. A split rim of a size to fit about a carrying rim, said rim having reduced ends bent to form lugs projecting inwardly and adapted to be passed through an opening in the carrying rim, the lugs being semicircular in cross section and threaded and cooperating with each other to form a threaded stem circular in cross section, and an internally threaded fastener screwed upon said stem and retaining the lugs forming the same in close contacting relation to each other with the rim in tight binding engagement with the carrying rim.

In testimony whereof we affix our signatures.

HEDWIG ZUBROW. [L. S.]
EMIL SOLOMON. [L. S.]